United States Patent

[11] 3,582,660

[72] Inventors Heinz Müller-Saala
Kirchberg;
Harry Riedel, Berkheim, both of, Germany
[21] Appl. No. 794,208
[22] Filed Jan. 27, 1969
[45] Patented June 1, 1971
[73] Assignee Eastman Kodak Company
Rochester, N.Y.
[32] Priority Apr. 5, 1968
[33] Germany
[31] P 17 72 151.6

[54] APPARATUS FOR SENSING IDENTIFYING MARKS PLACED UPON AN INFORMATION-BEARING MEDIUM
5 Claims, 1 Drawing Fig.

[52] U.S. Cl. .......... 250/219, 250/219, 235/61.11
[51] Int. Cl. .......... G08c 9/06
[50] Field of Search .......... 219/223, 209; 235/61.12, 61.115

[56] References Cited
UNITED STATES PATENTS
3,086,121 4/1963 Cockerell .......... 250/219
3,229,103 1/1966 Rantsch .......... 250/209
3,299,272 1/1967 Furukawa .......... 250/209
OTHER REFERENCES
Gable; R. Lewis

*Primary Examiner*—Walter Stolwein
*Attorney*—Robert W. Hampton

ABSTRACT: This disclosure relates to apparatus for sensing and counting code images or patterns disposed upon an information-bearing medium to identify the information carried by the medium. In an illustrative embodiment of this invention, the apparatus includes at least three suitable radiation-sensitive elements which are disposed to selectively sense the code images, suitable circuitry responsive to the signals derived from the radiation sensitive elements to provide an output signal in response to the scanning of a code image, and a suitable counting or summing device responsive to the circuitry to count and to provide a manifestation of the sum of such output signals.

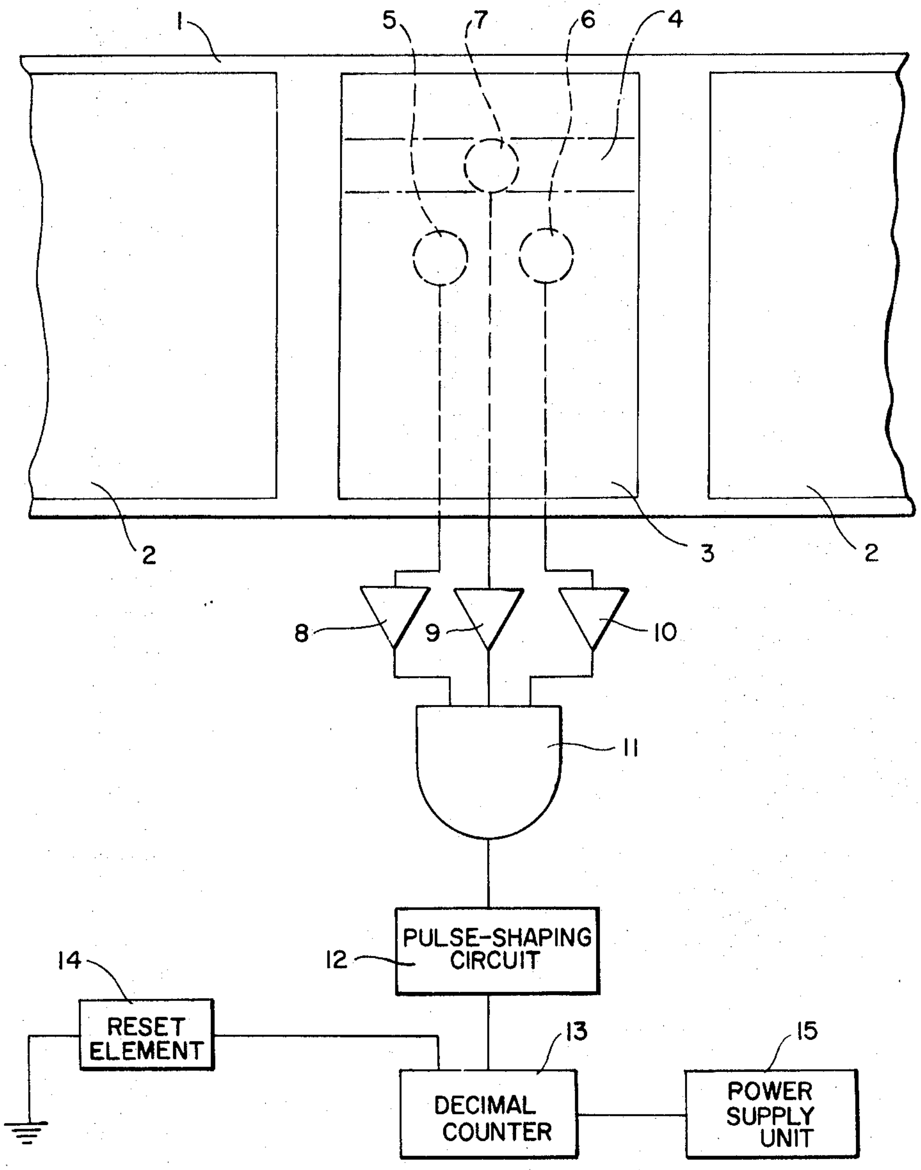
HARRY RIEDEL
HEINZ MULLER-SAALA
*INVENTORS*
BY R. Lewis Gable
R. L. Hampton
ATTORNEYS

APPARATUS FOR SENSING IDENTIFYING MARKS PLACED UPON AN INFORMATION-BEARING MEDIUM

BACKGROUND OF THE INVENTION

1. Field of the Invention

The invention relates to apparatus for retrieving information from an information-bearing medium and more particularly to such apparatus for sensing and counting the code images or patterns disposed upon an information-bearing medium such as a strip of microfilm.

Description of the Prior Art

One of the approaches for storing large quantities of information is to record as by photographing document images upon microfilm. Illustratively, several hundred feet of microfilm may be stored upon a single reel. A significant problem associated with microfilm in this form is that of efficiently problem selecting or retrieving and viewing a particular frame of information that has been recorded upon the strip of microfilm. Prior art methods of retrieving have been capable of approximately indicating the position of a particular frame upon the strip thereby requiring the searcher to proceed first to the approximate portion of the strip and then to search on a frame-by-frame basis until the particular frame is found. Obviously, such methods are time consuming and tedious for the searcher.

Further, there is suggested in the prior art a method for recording original documents onto a strip of microfilm with a pattern of bright and dark areas and for later reenlarging the microfilm frames onto a strip-sheet printing material whereby the pattern of bright and dark areas can be scanned by several photocells. The problem with such a method is to photoelectrically control the severing or cutting device associated with this apparatus so that it operates exclusively at the desired places. The use of checkerboardlike patterns of bright and dark areas have been suggested. The risk of errors is supposed to be decreased as the number of scanning elements is increased.

Furthermore, in the prior art a pattern of bright and dark areas is provided between the individual frame sections to form a code mark for selecting a certain frame. The scanning device including a plurality of photocells is designed to distinguish the code mark from the frame data to thereby respond only in a single case out of a plurality possibilities. Thus, a complicated scanning system is required which is not suitable to control a process to be started after each frame.

It is therefore an object of this invention to provide a new and improved apparatus for sensing and counting code images or patterns recorded upon a suitable information-bearing medium such as microfilm.

It is a more particular object of this invention to provide a new and improved apparatus for rapidly retrieving with minimum error a particular frame or image disposed upon the information-bearing medium.

It is a still further object of this invention to provide a new and improved apparatus for retrieving selected images from an information-bearing medium which is substantially unefected by either normal wear and tear or even by the misalignment of the frames upon the information-bearing medium.

SUMMARY OF THE INVENTION

These and other objects are accomplished in accordance with the teachings of this invention providing an apparatus for sensing code images disposed upon an information-bearing medium and including at least first, second and third means for sensing the code images to thereby derive first and second output signals, circuit means responsive to the first signal derived from said first means for sensing and to the second signals derived from said second and third means for sensing to thereby provide a third output signal, and counting means for summing the number or occurrences of the third output signal and for manifesting the count total.

In an illustrative embodiment of this invention, the means for sensing may take the form of photodiodes which are disposed in a triangular configuration to sense the code images or patterns. A code image includes a first portion of a first characteristic and a second portion of a second characteristic differing from said first characteristic; further, the code images are of similar configuration and are disposed between the information-bearing portions or frames of the medium. The first means for sensing is disposed to scan the first portion, whereas the second and third means for sensing are disposed to detect the second portion. The circuitry may illustratively include first, second and third amplifiers connected respectively to the first, second and third sensing means. The first amplifier operates upon the output signal derived from the first means for sensing to change the phase in a manner different from that of the second and third amplifier. The first, second and third amplifiers are connected to an AND gate which provides an output signal upon the coincidence of the application of the three input signals. A suitable device such as a decimal counter may be connected to the AND gate to provide a manifestation or visual indication of the number code images and thus information frames that have been scanned by the means for sensing.

The invention, and its objects and advantages will become more apparent in the detailed description of the preferred embodiments presented below.

BRIEF DESCRIPTION OF THE DRAWING

In the detailed description of the preferred embodiment of the invention presented below, reference is made to the accompanying drawing, in which a diagrammatic representation of the apparatus for sensing and counting is shown in accordance with the teachings of this invention.

DESCRIPTION OF THE PREFERRED EMBODIMENT

With regard to the drawing, there is shown an information-bearing medium 1 which may illustratively take the form of a strip of microfilm. The medium 1 has a plurality of information areas 2 repetitively along the length of the medium 1 and are of a substantially similar configuration. In one illustrative embodiment of this invention, the code images 3 includes a first portion taking the form of a strip 4 extending in the direction along which the medium is driven by suitable means (not shown). As shown in the drawing, the remaining portion of the coded pattern 3 constitutes a second portion of contrasted brightness or of a characteristic type different from that of the strip or mark 4. At least three radiation-sensitive elements or means for sensing 5, 6, and 7, which may illustratively take the form of silicon photodiodes, as shown in the drawing by dotted lines and identified by numerals 5, 6 and 7 are disposed to scan discrete areas of the code pattern 3. The spacing between the areas scanned by radiation-sensitive elements 5 and 6 is greater than the spacing between the frames 2 and the code images 3. Further, the radiation-sensitive area associated with the element 7 is of greater diameter than the transverse dimension of strip 4. The determination of these dimensions insures that the sensing apparatus will not miscount the patterns 3 on the medium 1. Illustratively, the three light-sensitive elements 5, 6 and 7 are disposed in array taking the form of an approximately equilateral triangle with the radiation-sensitive elements 5 and 6 disposed along a line substantially parallel to the direction in which the medium 1 is directed. Further, the three radiation-sensitive elements 5, 6 and 7 can be adjusted independently from each other and parallel to the plane in which the medium 1 is driven.

The output signals derived from the radiation-sensitive elements 5, 6 and 7 are respectively applied to amplifiers 8, 10 and 9, which is connected in turn to a junctive (or AND) gate 11 through its three input points. Electrical signals may be thought of in terms of their binary, logic state; more specifically, a signal with a relatively low amplitude may be defined as a "0" signal whereas a signal with a relatively large amplitude may be defined as a "1" signal. Depending upon the characteristic type of the first and second portions of the code pattern 3, the amplifiers 8, 9 and 10 may operate to invert the logic state of the signal applied thereto. For example, if the strip 4 is dark or opaque, the radiation-sensitive element 7, which is disposed to scan the strip 4, would generate little or no output signal. As a result, the amplifier 9 in this illustrative example would invert the logic state of the signal derived from the photosensitive element 7, i.e., change the input signal from a "0" to a "1" logic state. Further if the remaining or second portion of the code pattern 3 is substantially bright or clear, the amplifiers 8 and 10 would be designed to amplify without an inversion the signals derived from the radiation-sensitive elements at 5 and 6. As a result, when the radiation-sensitive elements 5, 6 and 7 simultaneously sense the code pattern 3, three output signals will be derived in phase and in the same logic state from the amplifiers 8, 9 and 10 and will be applied to the AND gate 11. The AND gate will respond in a manner well known in the art to provide an output pulse indicative of the sensing of a code pattern 3 by the array of radiation-sensitive elements. The output signal derived from the AND gate 11 is applied to a suitable pulse-shaping circuit 12 so that the resulting, appropriate shaped signal will properly actuate a counting means, which may illustratively take the form of a decimal counter 13. The decimal counter 13 serves as means for counting the occurrences of the output signal derived from the AND gate 11. A reset element 14 that can be operated by a pushbutton switch (not shown), for example, and a power supply 15 are connected to the decimal counter 13.

Thus, the apparatus described above and as shown in the drawing automatically counts each code pattern 3 when the radiation-sensitive elements 5 and 6 are simultaneously exposed to a second portion of the code pattern and the radiation element is exposed to the strip 4. In other words, the radiation-sensitive elements 5 and 6 are exposed to radiation of a contrasted brightness to that falling upon radiation-sensitive element 7 when the code pattern 3 is being scanned by the photosensitive elements 5, 6 and 7. As explained above with regard to one example, the amplifier units 8 and 10 are brightness amplifiers which serve to amplify the input signals without changing the phase or logic state thereof, whereas the amplifier 9 may serve as a darkness amplifier to thereby invert the logic state of the input signals. However, if the medium 1 takes the form of a positive strip of film, and the counting strip 4 appears as a clear or bright longitudinal strip, the logic state inverting characteristics of the amplifiers 8, 9 and 10 would be reversed.

Because commercial electronics may be employed, the above-described apparatus is a simple design, relatively inexpensive to manufacture and assemble, and relatively free from failure to detect a code pattern 3. The scanning and counting of the code patterns 3 is designed to operate free of error, since the three radiation-sensitive elements 5, 6 and 7 and the definition code patterns 3 are advantageously arranged. Even dust which appeared on the original document and was photographically recorded upon the medium 1, heavy dirt, wear and tear on the film, or the misalignment of the information areas 2 cannot normally cause the system to miscount.

Owing to the adjustable arrangement of the radiation-sensitive elements 5, 6 and 7, it is possible for special cases to vary the position of the strip 4 within the coded pattern 3. This may be achieved, for example, by photographically recording after each document area 2 a code pattern 3 from a black DIN A4 size sheet with a white cross area to thereby form the counting strip at a definite position. For the full length of the medium 1, the position of the strip within the width of the medium 1 will be constant, i.e. the same original will be photographed to provide the code area for the entire length of the medium 1.

One aspect of the invention suggests that the array of the radiation-sensitive elements 5, 6 and 7 may be selectively adjusted along a surface parallel to and along a direction transverse to the movement of the medium 1. If the position of the array of radiation-sensitive elements can be predetermined, additional coded information may be fed in and scanned by selecting appropriate strip positions.

The invention has been described in detail with particular reference to the preferred embodiment thereof, but it will be understood that variations and modifications can be effected within the spirit and scope of the invention.

We claim:

1. Information retrieving apparatus including:
a strip having recorded thereon information-bearing images and code images for identifying said information-bearing images, said information-bearing images being spaced from said code images by a predetermined distance, said code images being of substantially similar configuration and including a first portion of a first characteristic and a second portion of a second characteristic differing from said first characteristic;
at least first, second and third radiation sensing means each responsive to the first and second characteristics of said strip to provide first and second signals, said second and third radiation sensing means being disposed to sense areas of said strip separated by a distance greater than said predetermined distance; and
circuit means responsive to said first signal derived from said first radiation sensing means and to said second signals derived from said second and third radiation sensing means to provide a third signal, and summing means responsive to said third signal for manifesting the total number of occurrences of said third signal.

2. Apparatus for sensing coded images disposed on a strip to identify information-bearing images placed on he strip, the coded images being of substantially similar configuration and including a first portion of a first characteristic and a second portion of a second characteristic different from the first characteristic, the information-bearing images being spaced from the adjacent coded images by a predetermined distance, said apparatus including:
at least first, second and third sensing means, said first sensing means disposed to sense and to provide a first signal in response to the first portion, said second and third sensing means disposed to sense and to provide a second signal in response to the second portion, said second and third sensing means being disposed to sense areas of the strip separated by a distance greater than the predetermined distance;
circuit means responsive to the first signal derived from said first sensing means and to the second signals derived from said second and third sensing means to provide a third signal; and
counting means responsive to the third signal for indicating the total number of occurrences of the third signal.

3. Apparatus for sensing coded images disposed on an information bearing medium to identify information carried by the information-bearing medium, the coded areas being of substantially similar configuration and including a first portion of a first characteristic and a second portion of a second characteristic different from the first characteristic, said apparatus including:
at least first, second and third sensing means disposed in a triangular array, said first sensing means providing a first signal in response to the first portion, said second and third sensing means each providing a second signal in response to the second portion, said second and third sensing means being disposed along a line substantially parallel to the direction in which the information bearing medium is moved;
circuit means responsive to the first signal derived from said first sensing means and to the second signals derived from second and third sensing means to provide a third signal; and
counting means responsive to he third signal for manifesting the total number of occurrences of the third signal.

4. Apparatus for sensing code images disposed on an information-bearing strip to identify information images carried by the information-bearing strip, the code images being of substantially the same configuration and including a first portion of a first characteristic and a configuration extending in a direction substantially parallel to that to which the information bearing strip is moved, and a second portion of a second characteristic different from the first characteristic, said apparatus including:

at least first, second and third sensing means disposed in a triangular array, said first means disposed to provide a first signal in response to the first portion, said second and third means each disposed to provide a second signal in response to the second portion;

circuit means responsive to the simultaneous presence of the first signal derived from said first sensing means and of the second signals derived from said second and third sensing means, to provide a third signal; and counting means responsive to the third signal for manifesting the total number of occurrences of the third signal.

5. Apparatus as claimed in claim 4, wherein the information images are spaced from the adjacent code images by a predetermined distance, and said second and third sensing means being disposed to sense areas of the strip separated by a distance greater than the predetermined distance.